United States Patent [19]

Berns et al.

[11] Patent Number: 4,569,408

[45] Date of Patent: Feb. 11, 1986

[54] PORTABLE ANIMAL SCALE

[75] Inventors: Anthony J. Berns, Holy Cross; Hensel B. Peterson, Garnavillo, both of Iowa

[73] Assignee: Nordic Forge, Inc., Guttenberg, Iowa

[21] Appl. No.: 614,304

[22] Filed: May 25, 1984

[51] Int. Cl.[4] ............... G01G 21/08; G01G 19/52; G01G 3/14
[52] U.S. Cl. ................... 177/257; 177/132; 177/211
[58] Field of Search ............ 177/134, 196, 245, 253, 177/255, 257, 132, 211

[56] References Cited

U.S. PATENT DOCUMENTS

| | | | |
|---|---|---|---|
| 2,162,622 | 6/1939 | Lindsay | 177/134 X |
| 3,074,497 | 1/1963 | Hawbaker | 177/253 X |
| 3,658,143 | 4/1972 | Schwartz | 177/255 X |
| 3,726,353 | 4/1973 | Christensen | 177/245 X |
| 3,938,603 | 2/1976 | Shoberg et al. | 177/211 |
| 4,286,679 | 9/1981 | Schneider | 177/255 X |

FOREIGN PATENT DOCUMENTS 2830071  1/1980  Fed. Rep. of Germany ...... 177/255

Primary Examiner—E. A. Goldberg
Assistant Examiner—Patrick W. Foster
Attorney, Agent, or Firm—Schroeder & Siegfried

[57] ABSTRACT

A portable scale for weighing animals and the like. A weighing platform is suspended on top of two floating crossbar assemblies which are pivotally mounted to opposing edges of a rectangular wheeled base. Each crossbar assembly includes a lever member extending across the rectangular base toward the other lever. The levers are pivotally linked together at the center of the rectangular base such that weight applied to either crossbar assembly from the platform is transmitted to one of the levers which extends beyond the rectangular base. Downward motion of such lever is converted to a weight by a balance or load cell weighing mechanism. A weighing enclosure or basket is provided on top of the platform to confine animals therewithin during weighing.

14 Claims, 7 Drawing Figures

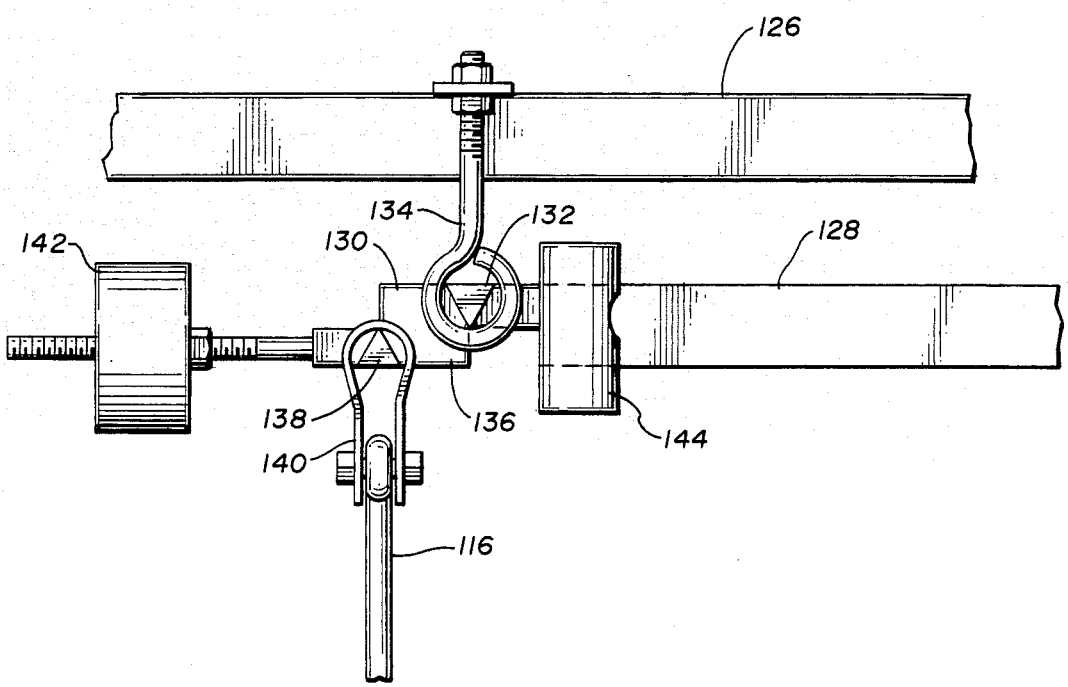
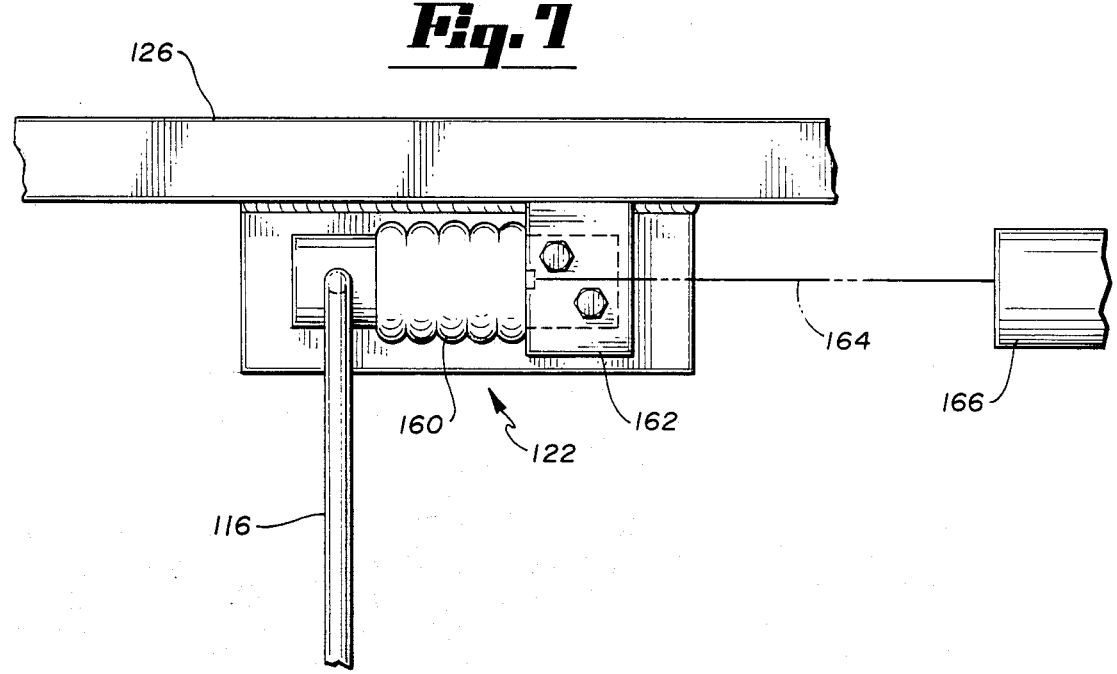

PORTABLE ANIMAL SCALE

DESCRIPTION

1. Field of the Invention

The present invention relates to scales and more particularly to scales used for weighing animals.

2. Background of the Invention

Previous livestock scales often included a weight beam supporting a floating deck. Animals were placed directly on the deck which could move both vertically and horizontally under the weight of the animal. Since animals such as cattle become easily frightened when they are unsure of their footing, movement of the platform upsets the animal causing difficulty in weighing. Also, normal shifting of weight by the animal while on the deck caused the weight sensing mechanisms to fluctuate greatly causing damage to the mechanisms.

Many prior forms of animal scales include the weight sensing mechanisms directly below the weighing platform. The sensitive weighing mechanisms were exposed to adverse environmental conditions which necessitated periodic cleansing. Sensitivity of such scales often would vary with the ground terrain upon which the scales rest. Uneven terrain, therefore, resulted in inaccurate weight recordings.

The weighing platforms on conventional animal scales are not readily removable for cleaning. The ability to clean the weighing platforms is especially desirable if the scale is used in farrowing houses to weigh animals at birth and at weaning to prevent transmittal of disease.

BRIEF SUMMARY OF THE INVENTION

The apparatus, according to the present invention, is a lightweight, relatively narrow portable scale that provides good sensitivity and accuracy while weighing animals. The scale includes a lower rectangular wheeled frame having suspension pins at each corner. A front main floating crossbar assembly is suspended between the front suspension pins of the frame and includes a crossbar lever extending across the frame laterally from the axis of pivot of the crossbar assembly. A similar back main floating crossbar assembly is suspended from the back suspension pins of the frame and includes a crossbar lever extending from its pivot axis across the base.

The crossbar levers are pivotally connected together at the midpoint of the base frame such that downward movement of either lever is translated to the other lever. One of the levers extends across the frame and projects beyond the base frame. An upstanding frame connected to the lower wheeled base frame carries either a load cell apparatus or a conventional balance beam. These weighing mechanisms are connected via a tension rod to the free end of the lever projecting beyond the frame such that downward movement of the lever is read as weight by the weighing mechanisms.

A generally rectangular weight transfer platform is situated above the floating crossbar assemblies. The platform includes weight transfer brackets adjacent each of its corners. Each bracket fits over a corresponding weight transfer pin connected to a floating crossbar assemblies. The weight transfer pins are spaced inwardly from the axis of pivot such that weight placed on the weight transfer platform exerts a downward force on each weight transfer pin. The spacing from the axis of pivot causes the weighing to be done by leverage. The distance between the weight transfer pins and the axis of pivot or fulcrum is directly related to the mechanical advantage or weight reduction provided to the balance beam.

A removable basket is placed on top of the weight transfer platform and functions to confine an animal therewithin. Preferably, the basket is formed of a lightweight, strong material which may be readily cleaned.

The unique suspension and leverage system of the invention provides accurate and sensitive weights to be determined whether the animal is moving within the basket or whether the weight of the animal is off-centered in the basket. The unique interconnected crossbar lever system transfers all weight equally to the tension rod connected to the weighing mechanism.

The most sensitive components of the portable scale as situated well above the weighing platform to prevent damage to the mechanism. The simple, dependable construction allows the basket to be removed and cleaned easily to prevent the transmittal of infection from one animal to another.

The unique floating crossbar assemblies provide a rugged scale which may be rolled from location to location without damaging the suspension and weight transfer mechanisms.

BRIEF DESCRIPTION OF THE DRAWINGS

A detailed description of one preferred embodiment of my invention is hereafter described with specific reference being made to the drawings in which:

FIG. 6 is a front elevational detail of the balance of the scale; and

FIG. 7 is a front view of a typical electronic weighing mechanism of the invention.

DETAILED DESCRIPTION OF THE INVENTION

Figure 1:
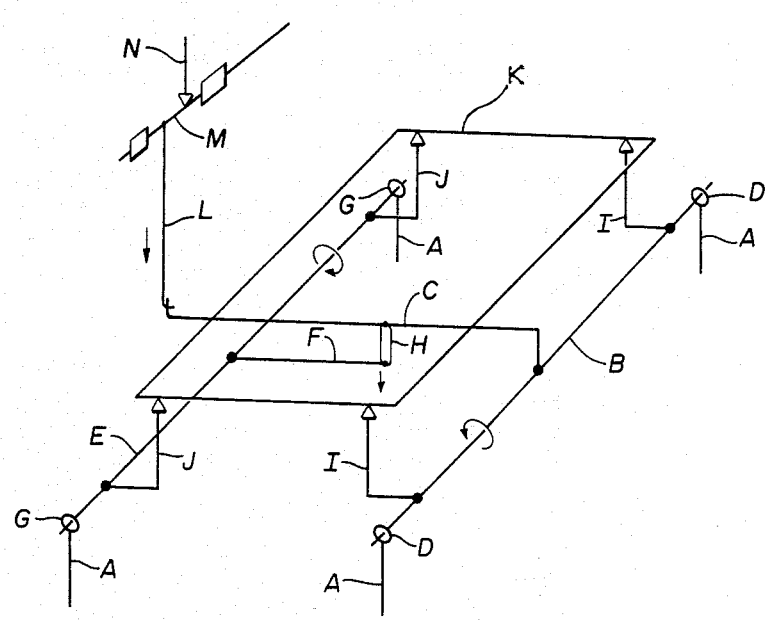
FIG. 1 is a schematic representation of the scale of the invention.

FIGS. 2 through 7 show a preferred embodiment of the portable animal scale of the invention. FIG. 1 is a schematic representation of the scale of the invention. Referring to FIG. 1, it will be seen that four upstanding support posts A define a horizontal plane. A front main floating crossbar B is pivotally mounted at its ends to support posts A which include pivots D such that the crossbar is rotatable without vertical displacement. A crossbar lever C attached to crossbar B extends across the device as shown.

A similarly constructed back main floating crossbar E is pivotally connected to the opposing support posts A through pivots G which allows the bar E to rotate without vertical displacement. Back main floating crossbar E includes a crossbar lever F which extends outwardly as shown such that crossbar lever C is positioned above crossbar lever F.

The crossbar levers are linked together at the midpoint between the opposing crossbars through crossbar lever linkage H. Linkage H allows either bar to move downwardly. Linkage H is constructed and arranged such that downward movement of lever F causes lever C to move downwardly.

An object to be weighed is positioned on top of weight transfer platform K. Weight transfer platform K is supported upon four weight transfer brackets I and J. Weight transfer brackets I extend outwardly from front crossbar B toward crossbar E as shown. The spacing from the axis of pivot of crossbar B causing weighing to be done by leverage. Similarly, weight transfer brackets J extend inwardly from the axis of pivot of back crossbar E. The length of the spacing from the axis of pivot is directly related to the mechanical advantage or weight reduction provided to balance beam M.

A balance beam M is suspended from balance pivot N which is suitably mounted to a fixed portion of a frame (not shown). Balance M is pivotally connected to a tension rod L whose lower end is connected to the free end of crossbar lever C. An object placed anywhere on weight transfer platform K will cause a force to be applied to the weight transfer brackets. Downward motion of the weight transfer brackets causes the front and back crossbars B and E, respectively, to rotate inwardly causing their respective crossbar levers C and F to move downwardly. An object positioned off-centered on the weight transfer platform K toward back main floating crossbar E will tend to cause a greater depression of crossbar lever F whose depression is transmitted by linkage H to lever C. A depression of crossbar lever C is transmitted to tension rod L to balance M. The weight of the object is read on balance M in a conventional manner.

Figure 2:
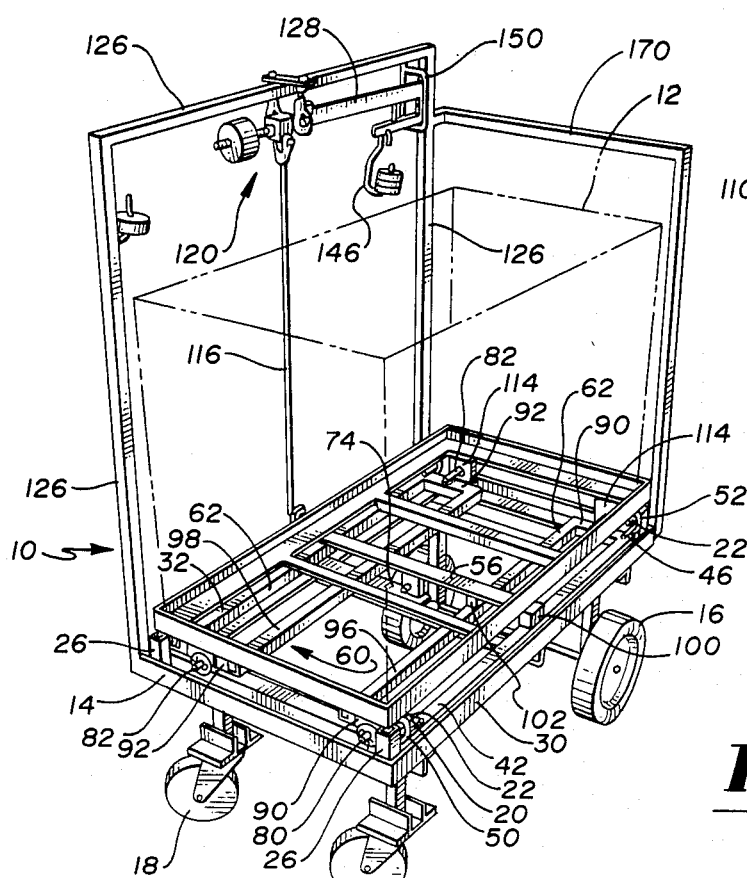
FIG. 2 is a perspective view of the scale showing the basket in phantom.

FIG. 2 shows the preferred embodiment of the portable animal scale 10 of the invention with a basket 12 (shown in phantom to prevent obscuring other parts). Scale 10 includes a rectangular main frame or base 14. Preferably, base 14 is carried by wheels 16 and casters 18 as shown.

Base 14 includes two pairs of fixed suspension pins 20, 22 mounted to upstanding posts 26 adjacent each corner of base 14. Pins 20 and 22 face each other along the front 30 and back 32 edges of the rectangular base 14.

A front main floating crossbar assembly 40 includes a bar 42 which extends between front pins 20, 22. Bar 42 includes a pair of floating suspension pins 44, 46 at its ends which enable assembly 40 to be suspended from base 14 by suspension links 50, 52 as shown. Assembly 40 includes a crossbar lever 56 which extends perpendicularly from bar 42 as shown and extends past the back edge 32 of base 14. Preferably, crossbar lever 56 crosses the center of rectangular base 14.

A back main floating crossbar assembly 60 includes a bar 62 which extends between back pins 20, 22. Bar 62 includes a pair of floating suspension pins 64, 66 at its ends which enable assembly 60 to be suspended from base 14 by suspension links 70, 72 as shown. Assembly 60 includes a crossbar lever 74 which extends perpendicularly from bar 62 as shown. Preferably, crossbar lever 74 crosses the center of rectangular base 14.

Figure 4:
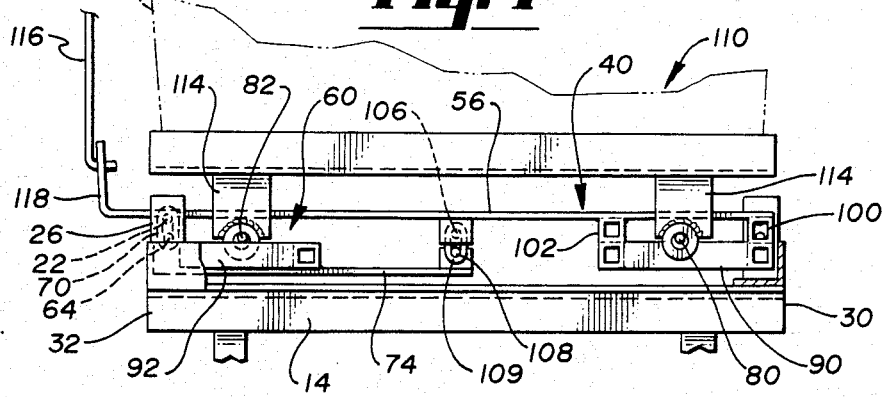
FIG. 4 is an end view of the portable scale with one corner shown in phantom and the other corner having parts cut away.

As shown in FIG. 4, crossbar assemblies 40 and 60 each include weight transfer pins 80, 82 respectively which extend parallel to the axes of bars 42 and 62. Weight transfer pins 80 and 82 are spaced from the axes or fulcrum points 86 and 88 formed by the suspension linkage between the base and crossbar assemblies. Preferably, each crossbar assembly 40 and 60 is formed as a rectangle including bars 42, 62, sides 90, 92 and inward bars 96, 98 respectively. Weight transfer pins 80, 82 are attached to sides 90, 92 respectively as shown.

Figure 3:
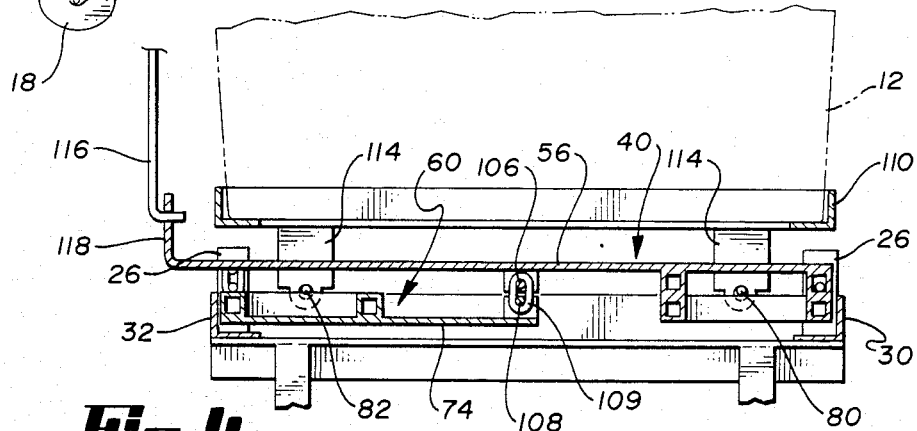
FIG. 3 is a sectional elevation of the portable scale of FIG. 2 taken along lines 3—3.

Referring to FIGS. 3 and 4, it will be seen that the planes of crossbar levers 56 and 74 differ and that crossbar lever 56 passes over lever 74. To accomplish the extra height needed for lever 56, bar sections 100, 102 may be added to bars 42, 96. Crossbar levers 56 and 74 are pivotally joined together at the midpoint between axes 86 and 88 such that downward movement of one lever is transmitted to downward movement of the other lever. As shown, crossbar lever 56 includes a suspension pin 106 directly above suspension pin 108 of crossbar lever 74 such that a suspension link 109 connects the levers.

A weight transfer platform 110 having a rectangular shape is positioned above base 14 and assemblies 40 and 60. It includes four weight transfer brackets 114 which extend downwardly and pivotally engage with weight transfer pins 80 and 82 as shown. Weight applied anywhere on platform 110 causes a downward force to be applied on one or more weight transfer pins. Downward motion of any weight transfer pin causes levers 56 and 74 to pivot downwardly due to their connection by link 109. Therefore, all weight is transferred equally to crossbar lever 56. A tension rod 116 connected to end 118 of lever 56 is connected to a weight measuring means such as a balance 120 shown in FIG. 2 or a load cell apparatus 122 as shown in FIG. 7 so as to convert the downward force applied to the lever end 114 to a readable unit of weight.

Figure 5:
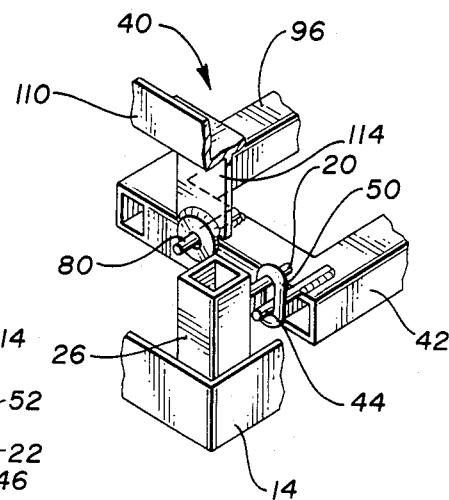
FIG. 5 is a fragmentary pictorial view of the invention showing the right front corner of the portable scale of the invention.

Referring to FIG. 5, a fragmentary pictorial view of the right front corner of scale 10 is shown. Each of the four corners are constructed and arranged in a similar manner. The spacing between the weight transfer pins and brackets and the axis of pivot of the crossbar assemblies provides a mechanical advantage or weight reduction to the scale.

Referring to FIGS. 2 and 6, balance 120 is shown suspended by a support framework 126. Conventional balance beam 120 includes a scaled beam 128 including an upper pivot block 130 and upper pivot 132 pivotally mounted to framework 126 as by eyebolts 134 as shown. A lower pivot block 136 attached to upper pivot block 130 extends laterally as shown and includes a lower pivot 138 to which the upper end of tension rod 116 is pivotally mounted by means of a pivot clevice 140 or the like.

A balance weight 142 is threaded to the end of lower pivot block 136 to provide taring of the portable scale 10. A sliding weight 144 is provided on the scaled beam 128. Additionally, scaled beam 128 may include a weight hanger 146 to which additional weights may be added to increase the weighing range of the scale. The correct weight is indicated by the sliding weight 144 when the scaled beam 128 is horizontal as indicated by fixed bar 150 attached to framework 126 as shown.

An alternative weight measuring means is a load cell apparatus 122 as shown in FIG. 7. A strain gauge sensing type load cell 160, such as load cells from BLH Electronics of Waltham, Mass. is attached parallel to the upper support framework 126 as shown by means of a metal tab 162. The upper end of tension rod 116 is attached to the free end of load cell 160. Addition of weight onto the weight platform 110 results in vertical tension being applied to the tension rod. A downward force is exerted perpendicular to the horizontally mounted load cell 160. The downward force on the load cell is converted to an analog electrical quantity. The electrical output increases proportionally to the weight increases. The electrical output is transmitted through an electrical cable 164 to an appropriate signal conditioning device 166 to convert the analog signal to a digital type display.

In operation, scale 10 is moved to the desired weighing location such as a farrowing house. Young pigs, for example, may be placed within basket 12 to confine the animals during weighing. Movement of the animals within the basket does not prevent reliable weighing since the floating crossbar assemblies transfer all weight from the platform equally to the tension rod connected to the crossbar lever. The basket 12 may be removed and cleaned when desired to prevent infection. The sensitive weighing mechanism is maintained above the platform and stays free of dirt and other damaging elements. Basket 12 is suitably made of plastic or fiberglass to provide a lightweight, easily cleaned container.

The suspension system of the crossbar assemblies, frame and weighing platform provides both sensitivity and sturdiness. Although not shown, each pin may include a cotter key inserted therethrough to maintain the suspension positioning. A handle 170 may be attached to frame 14 as desired.

In considering this invention, it should be remembered that the above disclosure is illustrative only, and that the scope of the invention is to be determined by the appended claims.

What is claimed is:

1. A weighing apparatus comprising:
   (a) a base support frame;
   (b) a pair of parallel, spaced apart horizontal crossbar members, each of said crossbar members being supported at each end by the base frame such that said crossbar members may rotate only about the longitudinal axis of the respective member;
   (c) each of said horizontal crossbar members including a crossbar lever, said crossbar levers being constructed and arranged such that one end is connected to a crossbar member and the other end extends toward the other crossbar member;
   (d) crossbar lever linking means for causing downward movement of either lever to be transmitted to the other lever, said linking means linking the levers together at about the midpoint between said crossbar members;
   (e) a generally rectangular weight transfer platform suspended above said crossbar members, said platform being supported by weight transfer brackets attached to each crossbar member, the attachment point of each weight transfer bracket to said platform being spaced inwardly from the longitudinal axes of the crossbar members such that said weight transfer brackets function as levers;
   (f) means for measuring the weight of an object positioned on said weight transfer platform and for providing an indication in units of weight, said means translating downward motion of a free end of one of said crossbar levers caused by said article into units of weight; and
   (g) at least one of said crossbar levers extending beyond the other crossbar lever and vertical confines of said platform and being connected to said measuring means.

2. The apparatus of claim 1 wherein said base includes wheel means for enabling the apparatus to be rolled from one location to another.

3. The apparatus of claim 1 including a basket having upstanding walls constructed and arranged to prevent an animal placed therewithin from escaping, said basket being carried by said weight transfer platform.

4. The apparatus of claim 3 wherein said measuring means comprises a tensile rod connected at one end to a free end of one of said crossbar levers and at the other rod end to a balance.

5. The apparatus of claim 1 wherein said weight transfer brackets are constructed and arranged such that said brackets are spaced inwardly from the longitudinal axes of said crossbar members so as to provide a weight reduction from the platform to the measuring means of at least about 3 to 1.

6. The apparatus of claim 5 wherein the spacing provides a weight reduction of about 9 to 1.

7. The apparatus of claim 1 wherein said crossbar levers are attached to the crossbar members at about the midpoint between the ends of said crossbar members.

8. An apparatus for weighing articles comprising:
   (a) a base frame of rectangular configuration;
   (b) a front main floating crossbar assembly being fulcrumed to said frame on a first fulcrum axis between the front corners of said frame and including a first crossbar lever extending from said front crossbar assembly across the midpoint of said frame;
   (c) a back main floating crossbar assembly being fulcrumed to said frame on a second fulcrum axis between the back corners of said frame and including a second crossbar lever extending from said back crossbar assembly across the midpoint of said frame;
   (d) center suspension means pivotally connecting said crossbar levers together at the midpoint of said frame such that downward movement of either lever is translated to the other lever;
   (e) weight transfer frame means transferring weight from an article placed on said weight transfer frame to said front and back crossbar assemblies, said means including a rectangular platform having weight transfer brackets adjacent each corner, said weight transfer brackets each being pivotally supported by weight transfer pins mounted to said back and front crossbar assemblies, said weight transfer pins being spaced from said fulcrum axes toward the midline of said base frame;
   (f) means for measuring the weight of an article positioned on said weight transfer platform and providing an indication in units of weight, said means translating downward motion of a free end of one of said crossbar levers caused by said article into units of weight; and
   (g) one of said crossbar levers having its outer end portion directly connected to said measuring means.

9. The apparatus of claim 8 wherein said base includes wheel means for allowing the apparatus to be rolled from one location to another.

10. The apparatus of claim 8 wherein said weight transfer frame means includes a basket carried by said rectangular platform, said basket including upstanding walls constructed and arranged to prevent an animal placed therewithin from escaping.

11. The apparatus of claim 8 wherein said measuring means comprises a tensile rod connected at one end to a free end of one of said crossbar levers and at the other rod end to a balance.

12. The apparatus of claim 8 wherein said measuring means comprises a tensile rod connected to a free end of one of said crossbar levers and to a tensile load cell means for generating an analog signal proportional to the magnitude of the tensile force applied thereto.

13. The apparatus of claim 11 wherein said weight transfer pins are mounted to said crossbar assemblies and spaced from said fulcrum axes so as to provide a weight reduction from the platform to the balance of at least about 3 to 1 so as to decrease the counterweights required for the balance.

14. The apparatus of claim 13 wherein the spacing provides a weight reduction of about 9 to 1.

* * * * *